(12) United States Patent
Kondo et al.

(10) Patent No.: US 11,088,573 B2
(45) Date of Patent: *Aug. 10, 2021

(54) METALLIC FOREIGN OBJECT DETECTOR, WIRELESS POWER TRANSMITTING DEVICE, WIRELESS POWER RECEIVING DEVICE, AND WIRELESS POWER TRANSMISSION SYSTEM

(71) Applicant: TDK Corporation, Tokyo (JP)

(72) Inventors: Kazuki Kondo, Tokyo (JP); Kazunori Oshima, Tokyo (JP); Akira Gotani, Tokyo (JP); Narutoshi Fukuzawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 126 days.

This patent is subject to a terminal disclaimer.

(21) Appl. No.: 16/470,911

(22) PCT Filed: Dec. 20, 2017

(86) PCT No.: PCT/JP2017/045744
§ 371 (c)(1),
(2) Date: Jun. 18, 2019

(87) PCT Pub. No.: WO2018/123768
PCT Pub. Date: Jul. 5, 2018

(65) Prior Publication Data
US 2019/0326787 A1  Oct. 24, 2019

(30) Foreign Application Priority Data
Dec. 27, 2016  (JP) .............................. JP2016-253818

(51) Int. Cl.
*H02J 50/60*  (2016.01)
*H02J 50/12*  (2016.01)
*G01V 3/10*  (2006.01)

(52) U.S. Cl.
CPC ................ *H02J 50/60* (2016.02); *G01V 3/10* (2013.01); *H02J 50/12* (2016.02)

(58) Field of Classification Search
CPC ..... H02J 50/60; G01V 3/10–12; B60L 53/124
See application file for complete search history.

(56) References Cited

U.S. PATENT DOCUMENTS

| | | | | | |
|---|---|---|---|---|---|
| 5,428,253 | A | * | 6/1995 | Ogata | ................ H03K 17/9547 307/116 |
| 6,724,191 | B1 | * | 4/2004 | Larsen | ..................... G01V 3/08 324/326 |

(Continued)

FOREIGN PATENT DOCUMENTS

JP  2000-134830 A  5/2000

OTHER PUBLICATIONS

Chinese Office Action issued in coresponding Chinese Patent Application No. 201780081093.7, dated May 28, 2020, with English translation.

(Continued)

*Primary Examiner* — Rexford N Barnie
*Assistant Examiner* — David A Shiao
(74) *Attorney, Agent, or Firm* — McDermott Will & Emery LLP

(57) ABSTRACT

An object of the present invention is to improve the accuracy of detection of the metallic foreign object. A metallic foreign object detector includes a sensor part having at least one antenna coil that receives a magnetic field or current to generate a vibration signal, an integration circuit that acquires the integral value of a waveform of a signal corresponding to the vibration signal, and a determination circuit that determines the presence/absence of a metallic foreign object approaching the antenna coil based on the integral value and a criterion integral value which is the (Continued)

integral value obtained in the absence of the approaching metallic foreign object. The integral value and the criterion integral value are obtained by integrating the waveform having the same wavenumber.

10 Claims, 12 Drawing Sheets

(56) References Cited

U.S. PATENT DOCUMENTS

| | | | | |
|---|---|---|---|---|
| 7,701,204 | B2* | 4/2010 | Westersten | G01V 3/104 |
| | | | | 324/228 |
| 2003/0016008 | A1* | 1/2003 | Christensen | G01V 3/104 |
| | | | | 324/207.26 |
| 2005/0242817 | A1* | 11/2005 | Hoult | G01R 33/288 |
| | | | | 324/326 |
| 2009/0167299 | A1* | 7/2009 | Nishio | G01V 3/104 |
| | | | | 324/239 |
| 2012/0313579 | A1 | 12/2012 | Matsumoto et al. | |
| 2016/0349782 | A1* | 12/2016 | Tsai | H02J 50/80 |

OTHER PUBLICATIONS

International Search Report issued in corresponding International Patent Application No. PCT/JP2017/045744, dated Mar. 27, 2018, with English Translation.

* cited by examiner

METALLIC FOREIGN OBJECT DETECTOR, WIRELESS POWER TRANSMITTING DEVICE, WIRELESS POWER RECEIVING DEVICE, AND WIRELESS POWER TRANSMISSION SYSTEM

CROSS REFERENCE

This application is the U.S. National Phase under 35 US.C. § 371 of International Application No. PCT/JP2017/045744, filed on Dec. 20, 2017, which claims the benefit of Japanese Application No. 2016-253818, filed on Dec. 27, 2016, the entire contents of each are hereby incorporated by reference.

TECHNICAL FIELD

The present invention relates to a metallic foreign object detector, a wireless power transmitting device, a wireless power receiving device, and a wireless power transmission system.

BACKGROUND ART

In recent years, wireless power feeding adapted to feed power by wireless has been eagerly studied. There are various systems for realizing the wireless power feeding, and a system using a magnetic field is known as one of them. The system using a magnetic field includes an electromagnetic induction system and a magnetic field resonance system.

The electromagnetic induction system, which is already widely known, can perform power feeding with high efficiency due to a high coupling degree between a power transmitting device for feeding power and a power receiving device for receiving power, whereas power feeding cannot be achieved unless the power transmitting device and power receiving device are located close to each other. On the other hand, the magnetic field resonance system is a system that actively uses a resonance phenomenon, so that the coupling degree between the power transmitting device and the power receiving device may be low, and power feeding can be achieved even when the power transmitting device and the power receiving device are located away from each other to some extent.

The electromagnetic induction system and magnetic field resonance system both perform power feeding by using magnetism. Thus, in both the systems, the power transmitting device has a feeding coil for feeding power by using magnetism, and the power receiving device has a receiving coil for receiving power by using magnetism. The feeding coil and the receiving coil are magnetically coupled to each other, whereby power is fed from the power transmitting device to power receiving device.

When a metallic foreign object enters between the magnetically coupled feeding coil and receiving coil, an eddy current flows in the metallic foreign object by magnetic flux, resulting in heat generation in the metallic foreign object, which deteriorates power feeding efficiency. Thus, it is necessary to detect the metallic foreign object entering between the power transmitting device and the power receiving device.

Patent Document 1 discloses a circuit (load detection circuit 30) that can detect approach of the metallic foreign object. The load detection circuit 30 is configured to detect the peak value of an oscillation signal (vibration signal) that a load sensor 31 receives by using a peak value detection circuit 32a, integrate the detected peak value by using an integration circuit 32b, and turn ON/OFF the driving of a primary resonance coil L12 (feeding coil) of a primary resonance circuit 12 by using a second switching circuit 13SS based on a signal formed by a waveform shaping circuit 32c. The peak value rises when the metallic foreign object approaches, so that the load detection circuit 30 can turn OFF the driving of the resonance coil L12 (feeding coil) of the primary resonance circuit 12 when the metallic foreign object approaches.

CITATION LIST

Patent Document

[Patent Document 1] JP 2000-134830 A

SUMMARY OF INVENTION

Technical Problem to be Solved by Invention

However, in the technique disclosed in Patent Document 1, the peak value of the oscillation signal (vibration signal) is integrated after rectification, so that the resultant integral value includes information of both the amplitude and frequency of the oscillation signal (vibration signal). As a result, the wavenumber in a fixed section is changed depending on the presence/absence of the metallic foreign object, preventing the integral value from being monotonously changed with respect to a change in the amplitude of the oscillation signal (vibration signal). This makes it difficult for the technique disclosed in Patent Document 1 to detect the metallic foreign object with high accuracy.

The present invention has been made in view of the above problem, and the object thereof is to improve the accuracy of detection of the metallic foreign object.

Means for Solving the Problem

A metallic foreign object detector according to the present invention includes a sensor part having at least one antenna coil that receives a magnetic field or current to generate a vibration signal, an integration circuit that acquires the integral value of a waveform of a signal corresponding to the vibration signal, and a determination circuit that determines the presence/absence of a metallic foreign object approaching the antenna coil based on the integral value and a criterion integral value which is the integral value obtained in the absence of the approaching metallic foreign object, wherein the integral value and the criterion integral value are obtained by integrating the waveform having the same wavenumber.

According to the present invention, when the metallic foreign object approaches the antenna coil, the integral value can be obtained by integrating the waveform having the same wavenumber as the criterion integral value. Thus, out of changes in the amplitude and frequency of the signal generated in the antenna coil due to approach of the metallic foreign object, a change in the amplitude appears more remarkably in the integral value. Accordingly, the integral value is changed substantially monotonously with respect to the change in the amplitude of the vibration signal, thus improving the accuracy of detection of the metallic foreign object.

The above metallic foreign object detector may further include a rectification circuit that rectifies an output signal from the sensor part, and the signal corresponding to the vibration signal may be an output signal from the rectification circuit. This allows a signal that has been rectified by the rectification circuit to be an object of integration.

In each of the above metallic foreign object detectors, the start point of integrating the waveform used for acquiring the integral value and the criterion integral value can be freely adjusted, and the wavenumber of the waveform used for acquiring the integral value and the criterion integral value can be freely adjusted.

Each of the above metallic foreign object detectors may further include a drive circuit that supplies the current to the antenna coil, a wavenumber detection circuit that detects the wavenumber of the vibration signal or of the signal corresponding to the vibration signal, and a control circuit that makes the wavenumber detection circuit and the integration circuit start the wavenumber detection and the integration, respectively, and makes the integration circuit end the integration when the wavenumber detected by the wavenumber detection circuit reaches a predetermined value. The control circuit may make the wavenumber detection circuit and the integration circuit start the wavenumber detection and the integration, respectively, when a predetermined time has elapsed from when the drive circuit started supplying the current to the antenna coil. This can delay the integration start point so as not to allow the integration to be performed during a period (e.g., a predetermined period immediately after the drive circuit started supplying the current to the antenna coil) during which a change in the integral value is small while the amplitude component of the vibration signal output from the sensor part is large. Thus, an integration section can be set in a range where a change in the integral value of the vibration signal output from the sensor part is large, thereby further improving the accuracy of detection of the metallic foreign object.

Each of the above metallic foreign object detectors may further include a wavenumber detection circuit that detects the wavenumber of the vibration signal or of the signal corresponding to the vibration signal and a control circuit that makes the wavenumber detection circuit and the integration circuit start the wavenumber detection and the integration, respectively, and makes the integration circuit end the integration when the wavenumber detected by the wavenumber detection circuit reaches a predetermined value. The wavenumber of the waveform used for acquiring the integral value and the criterion integral value can be freely adjusted due to a fact that the predetermined value can be freely adjusted. Thus, the wavenumber of the waveform used for acquiring the criterion integral value can be set to a natural number, so that even if the position of the integration start point with respect to the waveform varies, influences exerted on the integral value can be suppressed. Further, by increasing the wavenumber of the waveform used for acquiring the criterion integral value depending on the situation, the difference between the integral value and the criterion integral value in the presence of the metallic foreign object can be made larger, making it possible to further improve the accuracy of detection of the metallic foreign object.

A wireless power transmitting device according to the present invention is a device that transmits power by wireless from a feeding coil to a receiving coil and includes the feeding coil and any one of the above metallic foreign object detectors. According to the present invention, there can be provided a wireless power transmitting device having a metallic foreign object detector with improved accuracy of detection of the metallic foreign object.

A wireless power receiving device according to the present invention is a device that transmits power by wireless from a feeding coil to a receiving coil and includes the receiving coil and any one of the above metallic foreign object detectors. According to the present invention, there can be provided a wireless power receiving device having a metallic foreign object detector with improved accuracy of detection of the metallic foreign object.

A wireless power transmission system according to the present invention is a system that transmits power by wireless from a feeding coil to a receiving coil and includes a wireless power transmitting device having the feeding coil and a wireless power receiving device having the receiving coil. At least one of the wireless power transmitting device and the wireless power receiving device has any one of the above metallic foreign object detectors. According to the present invention, there can be provided a wireless power transmission system having a metallic foreign object detector with improved accuracy of detection of the metallic foreign object in at least one of the wireless power transmitting device and the wireless power receiving device.

Advantageous Effects of the Invention

According to the present invention, it is possible to improve the accuracy of detection of the metallic foreign object.

MODE FOR CARRYING OUT THE INVENTION

Figure 1:
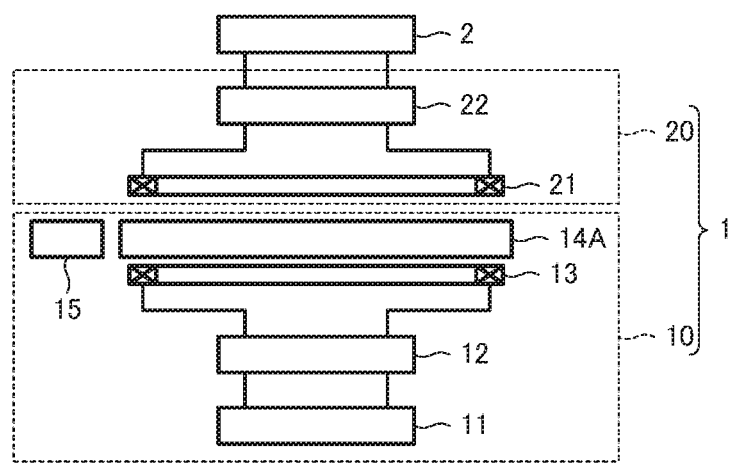
FIG. 1 is a view illustrating the schematic configuration of a wireless power transmission system 1 according to a first embodiment of the present invention and a load 2 connected to the wireless power transmission system 1.

Hereinafter, embodiments of the present invention will be described in detail with reference to the accompanying drawings. The present invention is not limited by the content described below. Further, constituent elements of the following embodiments include those easily occur to those skilled in the art, and include those substantially identical or equivalent in the scope thereof. Furthermore, in the following description, the same reference numerals are given to the same elements or elements having the same function, and repeated description will be omitted.

First Embodiment

FIG. 1 is a view illustrating the schematic configuration of a wireless power transmission system 1 according to the first embodiment of the present invention and a load 2 connected to the wireless power transmission system 1. As illustrated, the wireless power transmission system 1 includes a wireless power transmitting device 10 and a wireless power receiving device 20. The load 2 is connected to the wireless power receiving device 20.

The wireless power transmission system 1 is a system used for power feeding to a moving body such as an electric vehicle (EV) or a hybrid vehicle (HV) that utilizes power from a secondary battery. In this case, the wireless power transmitting device 10 is mounted in power feeding facility installed on the ground, and the wireless power receiving device 20 is mounted on the vehicle. The following description will be given assuming that the wireless power transmission system 1 is a system for power feeding to the electric vehicle.

Figure 2:
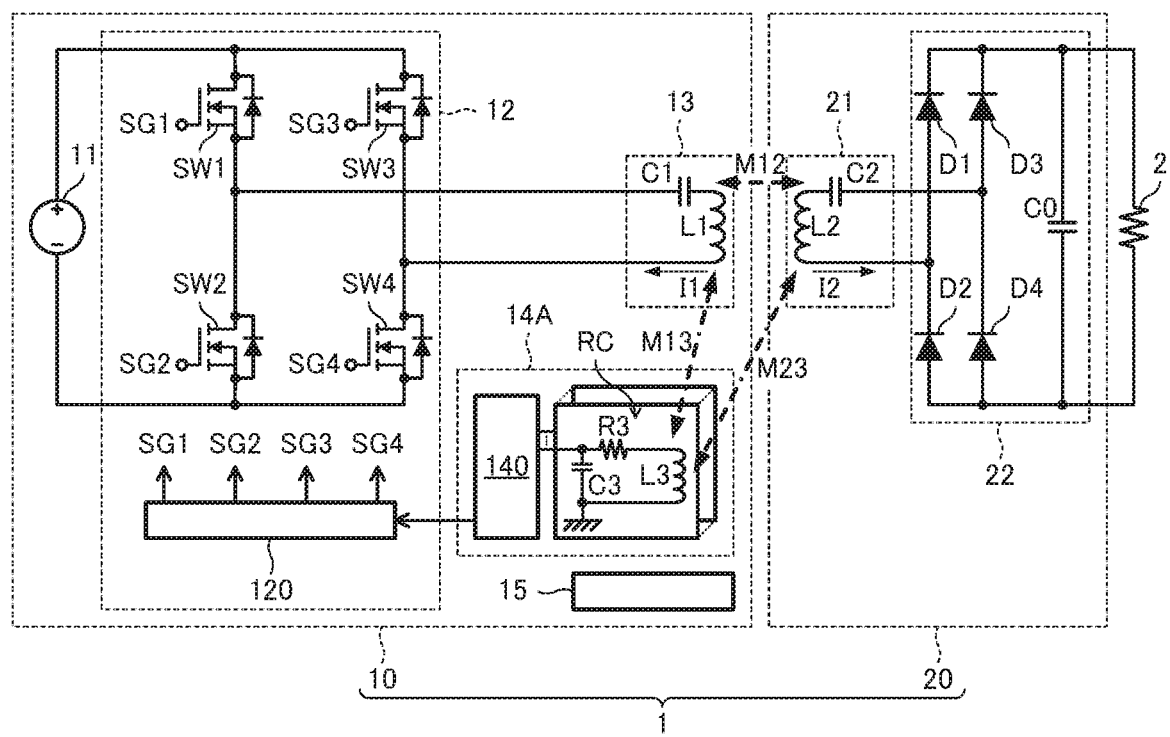
FIG. 2 is a view illustrating the internal circuit configurations of the wireless power transmitting device 10 and wireless power receiving device 20 illustrated in FIG. 1, respectively.

FIG. 2 is a view illustrating the internal circuit configurations of the wireless power transmitting device 10 and wireless power receiving device 20, respectively. Hereinafter, with reference to FIGS. 1 and 2, the outline of the configuration of the wireless power transmission system 1 will be described first, followed by detailed description of the characteristic configuration of the present invention.

As illustrated in FIGS. 1 and 2, the wireless power transmitting device 10 includes a DC power supply 11, a power converter 12, a feeding coil part 13, a metallic foreign object detector 14A, and a noise detection part 15. Although the metallic foreign object detector 14A is provided in the wireless power transmitting device 10 in the present embodiment, it may be provided in the wireless power receiving device 20.

The DC power supply 11 supplies DC power to the power converter 12. The DC power supply 11 is not particularly limited in type as long as it can supply DC power. For example, a DC power supply obtained by rectifying/smoothing a commercial AC power supply, a secondary battery, a DC power supply generated by solar power, and a switching power supply such as a switching converter can be suitably used as the DC power supply 11.

The power converter 12 is an inverter that converts the DC power supplied from the DC power supply 11 into AC power to thereby supply AC current I1 illustrated in FIG. 2 to the feeding coil part 13. Specifically, as illustrated in FIG. 2, the power converter 12 includes a switching circuit (full-bridge circuit) including a plurality of bridge-connected switching elements SW1 to SW4 and a switch drive part 120. Although the switching circuit in the power converter 12 is constituted by the full-bridge circuit in this example, other type of switching circuit may be used.

The switching elements SW1 to SW4 are configured to perform ON/OFF operation independently of each other by control signals SG1 to SG4 supplied from the switch drive part 120 to the gates thereof, respectively. A MOSFET (Metal Oxide Semiconductor Field Effect Transistor) and an IGBT (Insulated Gate Bipolar Transistor) can be suitably used as the switching elements SW1 to SW4.

The switch drive part 120 is a signal generation part that generates the control signals SG1 to SG4 so that the output voltage of the switching circuit including the switching elements SW1 to SW4 becomes AC voltage of a predetermined frequency. Accordingly, the AC voltage of a predetermined frequency is supplied to a feeding coil L1 to be described later. Hereinafter, the predetermined frequency is referred to as "power transmission frequency fp". The value of the power transmission frequency fp is set to, e.g., 20 [kHz] to 200 [kHz].

As illustrated in FIG. 2, the feeding coil part 13 is a resonance circuit (feeding side resonance circuit) including a feeding side capacitor C1 and a feeding coil L1 which are connected in series and generates an alternating magnetic field based on the AC voltage supplied from the power converter 12. The resonance frequency of the feeding side resonance circuit constituting the feeding coil part 13 is set to a frequency equal or close to the above-mentioned power transmission frequency fp. The feeding side capacitor C1 may be connected parallel to the feeding coil L1.

The feeding coil L1 is a spiral structure coil formed by planarly winding, by about several turns to about several tens of turns, a litz wire obtained by twisting about two thousand insulated copper wires each having a diameter of ϕ0.1 (mm) and is disposed, e.g., in or near the ground. When AC voltage is supplied from the power converter 12 to the feeding coil L1, the AC current I1 illustrated in FIG. 2 flows in the feeding coil L1, whereby the alternating magnetic field is generated. The alternating magnetic field causes electromotive force to be generated in a receiving coil L2 to be described later by a mutual inductance M12 between the feeding coil L1 and the receiving coil L2, whereby power transmission is achieved.

The metallic foreign object detector 14A is a device having a function of detecting the presence/absence of a metallic foreign object approaching the feeding coil L1 and includes, as illustrated in FIG. 2, a plurality of resonance circuits RC each including an antenna coil L3 and a capacitor C3 for metallic foreign object detector and a detection part 140 connected to the resonance circuits. A resistor R3 illustrated in FIG. 2 is a series resistor of the antenna coil L3.

The metallic foreign object detector 14A is provided for the purpose of detecting a metallic foreign object existing between the feeding coil L1 and the receiving coil L2. Thus, as illustrated in FIG. 1, at least apart (specifically, antenna coils L3) of the metallic foreign object detector 14A is disposed on the surface of the feeding coil L1 opposed to the receiving coil L2, i.e., between the feeding coil L1 and the receiving coil L2. The metallic foreign object detector 14A and feeding coil L1 may be formed as an integrated unit or as separate units. Details of the metallic foreign object detector 14A will be described later.

The noise detection part 15 is configured to detect noise having a frequency higher than the power transmission frequency fp. The specific configuration of the noise detection part 15 is not particularly limited and, for example, the noise detection part 15 preferably includes a current detection circuit that detects a current waveform flowing in the feeding coil L1, a high-pass filter that extracts only a high-frequency component from an output signal from the current detection circuit, and a synchronization signal generation part that issues a synchronization signal when the amplitude of the output signal of the high-pass filter exceeds a predetermined value, i.e., during the generation period of the high-frequency component. In place of the current detection circuit, a voltage detection circuit such as a resistance-voltage dividing circuit may be used. The cut-off frequency of the high-pass filter is preferably set to a frequency higher than the power transmission frequency fp. Besides, the noise detection part 15 may be configured by disposing a magnetic sensor such as a hall element or a magnetoresistance effect element between the feeding coil L1 and the receiving coil L2.

The wireless power receiving device 20 includes a receiving coil part 21 and a rectifier 22, as illustrated in FIGS. 1 and 2.

As illustrated in FIG. 2, the receiving coil part 21 includes a resonance circuit (receiving side resonance circuit) including a receiving side capacitor C2 and a receiving coil L2 which are connected in series and plays a role as a power receiving part that receives AC power transmitted from the feeding coil L1 by wireless. The resonance frequency of the receiving side resonance circuit constituting the receiving coil part 21 is also set to a frequency equal or close to the above-mentioned power transmission frequency fp. The receiving side capacitor C2 may be connected parallel to the receiving coil L2.

Like the feeding coil L1, the receiving coil L2 is a spiral structure coil formed by planarly winding, by about several turns to about several tens of turns, a litz wire obtained by twisting about two thousand insulated copper wires each having a diameter of ϕ0.1 (mm). On the other hand, the mounting position of the receiving coil L2 differs from that of the feeding coil L1 and, for example, the receiving coil L2 is mounted to the lower portion of the body of an electric vehicle. When magnetic flux generate by the feeding coil L1 interlinks the receiving coil L2, electromotive force by electromagnetic induction is generated in the receiving coil L2, whereby AC current I2 illustrated in FIG. 2 flows in the receiving coil L2. The AC current I2 is converted into DC current by the rectifier 22 and is then supplied to the load 2. Thus, the DC power can be supplied to the load 2.

The rectifier 22 is a circuit that rectifies the AC current output from the receiving coil part 21 into DC current to supply DC power to the load 2. Specifically, as illustrated in FIG. 2, the rectifier 22 includes a bridge circuit including four bridge-connected diodes D1 to D4 and a smoothing capacitor C0 connected parallel to the bridge circuit.

The load 2 includes a charger and a battery which are not illustrated. The charger is a circuit that charges the battery based on the DC power output from the rectifier 22. The charging is executed by, e.g., constant-voltage/constant-current charging (CVCC charging). The battery is not particularly limited in type as long as it can store power. For example, a secondary battery (lithium-ion battery, a lithium-polymer battery, a nickel battery, etc.) and a capacitive element (electric double-layer capacitor, etc.) can be suitably used as the battery constituting the load 2.

Figure 3:
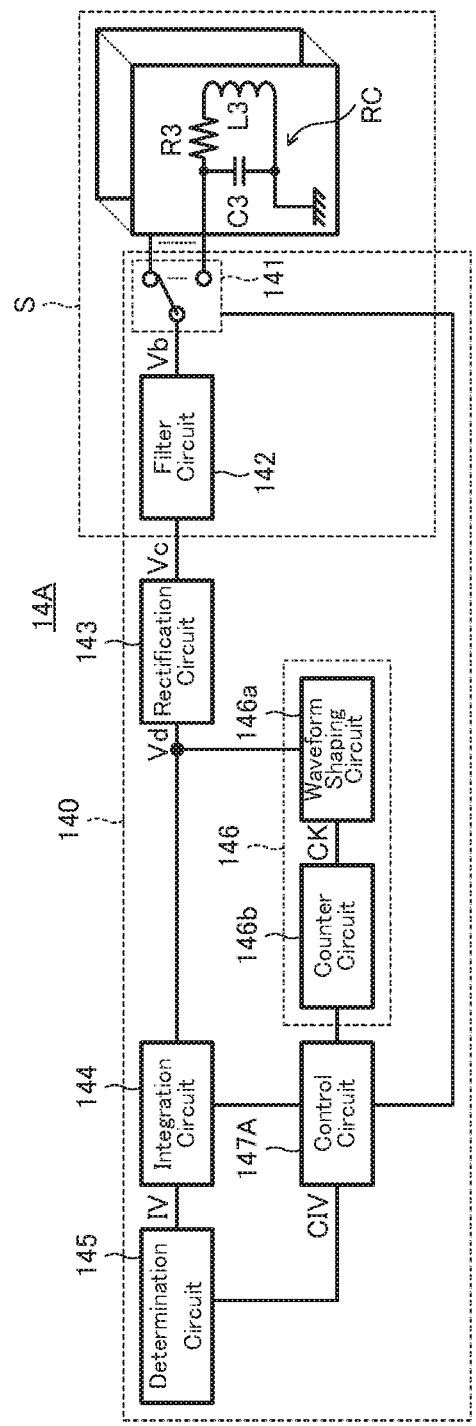
FIG. 3 is a schematic block diagram illustrating the functional block of the metallic foreign object detector 14A illustrated in FIG. 2.
Figure 4A:
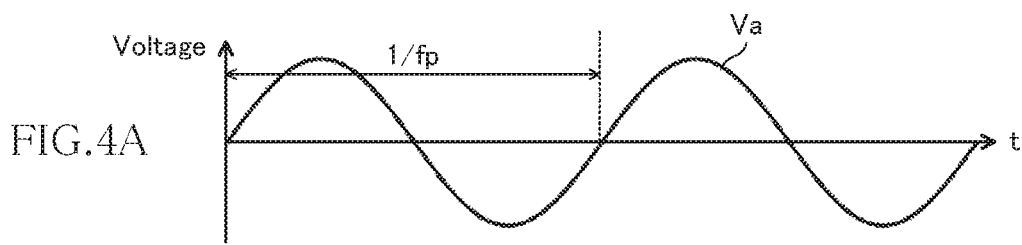
FIGS. 4A to 4F are views illustrating the waveforms of various signals concerning the metallic foreign object detector 14A illustrated in FIG. 2.
Figure 4B:
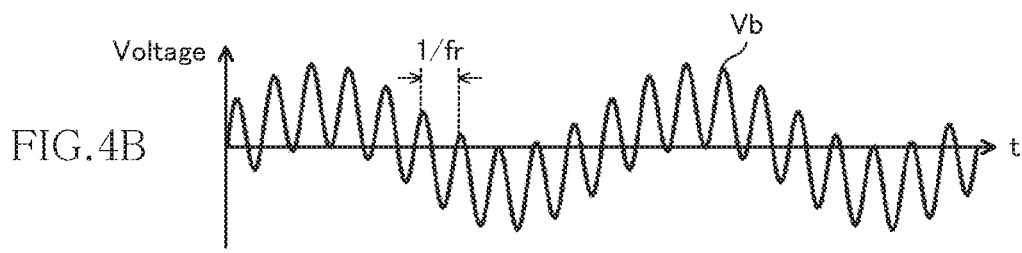
Figure 4C:
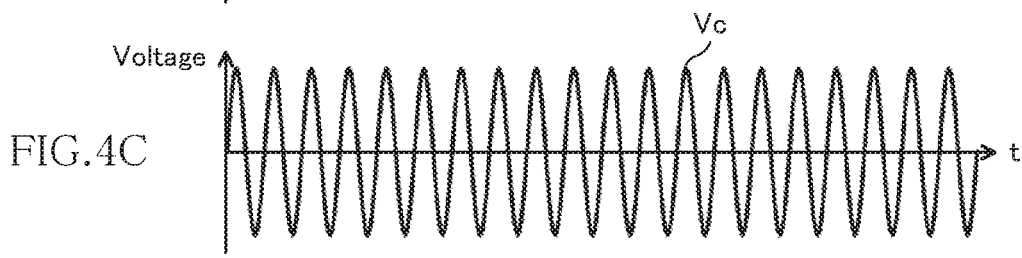
Figure 4D:
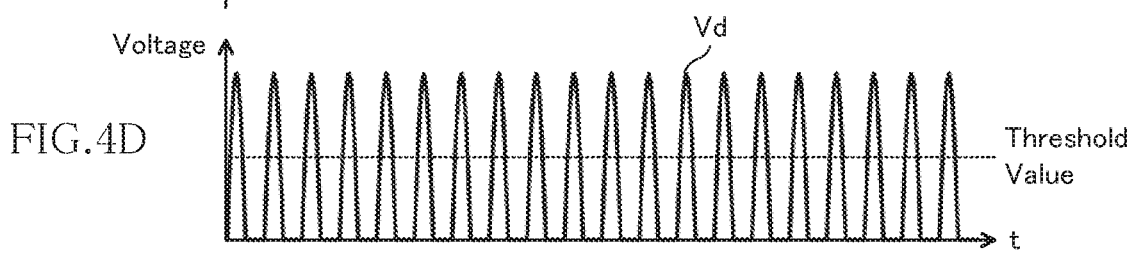
Figure 4E:
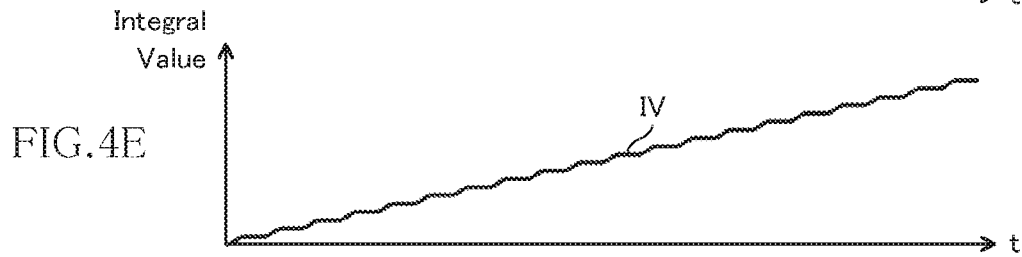
Figure 4F:
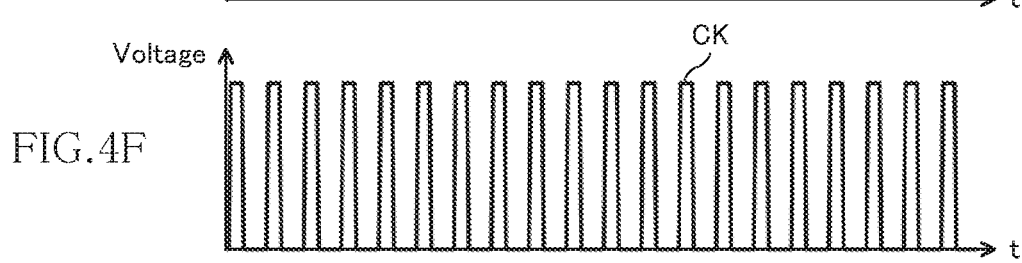
Figure 5A:
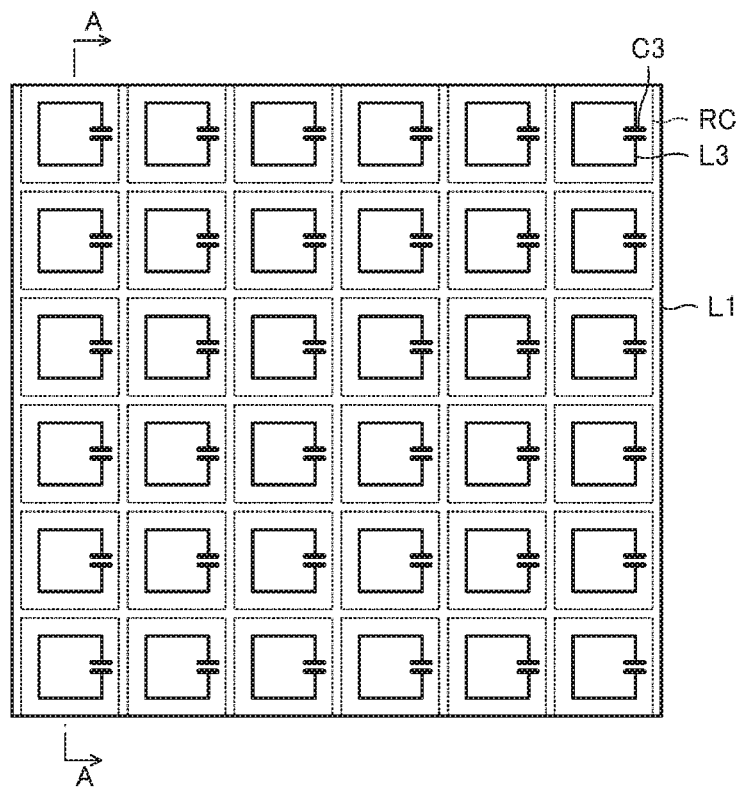
FIG. 5A is a plan view illustrating the positional relationship between the feeding coil L1 and the antenna coils L3 illustrated in FIG. 2.
Figure 5B:
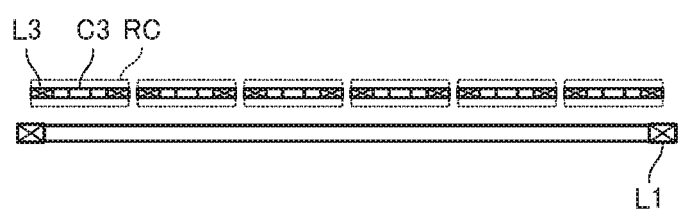
FIG. 5B is a cross-sectional view of the feeding coil L1 and the antenna coils L3 taken along line A-A of FIG. 5A.

The following describes details of the metallic foreign object detector 14A with reference to FIG. 3, FIGS. 4A to 4F, and FIGS. 5A and 5B. FIG. 3 is a schematic block diagram illustrating the functional block of the metallic foreign object detector 14A. FIGS. 4A to 4F are views illustrating the waveforms of various signals concerning the metallic foreign object detector 14A. FIG. 5A is a plan view illustrating the positional relationship between the feeding coil L1 and the antenna coils L3, and FIG. 5B is a cross-sectional view of the feeding coil L1 and the antenna coils L3 taken along line A-A of FIG. 5A.

Referring first to FIGS. 5A and 5B, the plurality of resonance circuits RC are arranged in a matrix within an area corresponding to the inside of the feeding coil L1, as viewed from above. Such an arrangement of the resonance circuits RC can be realized by placing, on the feeding coil L1, a printed board (not illustrated) on the surface of which a conductive coil pattern is formed.

With the above arrangement, when the above-mentioned alternating magnetic field (magnetic field vibrating at the power transmission frequency fp) occurs in the feeding coil L1, electromotive force is induced in the antenna coils L3 by a mutual inductance M13 between the feeding coil L1 and the antenna coils L3 illustrated in FIG. 2 and a mutual inductance M23 between the receiving coil L2 and the antenna coils L3 illustrated in FIG. 2. The electromotive force generates a vibration signal Vb in the antenna coils L3. That is, the antenna coils L3 according to the present embodiment are configured to generate a vibration signal by receiving a magnetic field.

The vibration signal generated in each antenna coil L3 contains, in addition to the component of the power transmission frequency fp which is the frequency of the alternating magnetic field, the component of the resonance frequency fr of each resonance circuit RC. The value of the resonance frequency fr is set to a single value extremely higher than the power transmission frequency fp by adjusting the inductance of the antenna coil L3 and the capacitance of the capacitor C3. Specifically, the value of the resonance frequency fr is preferably set to 3000 [kHz]. The capacitance of the capacitor C3 is preferably set to a value of about several hundreds [pF] to several thousands [pF].

FIG. 4A illustrates a signal Va vibrating at the power transmission frequency fp, and FIG. 4B illustrates a vibration signal Vb generated in each resonance circuit RC. FIGS. 4A and 4B reveal that the vibration signal Vb is a signal obtained by superimposing the component of the resonance frequency fr on the signal Va vibrating at the power transmission frequency fp. Although details will be described later, the detection part 140 of the metallic foreign object detector 14A extracts only the component of the resonance frequency fr from the vibration signal Vb and detects the metallic foreign object existing between the feeding coil L1 and the receiving coil L2 by utilizing a change in the component of the resonance frequency fr.

In the present embodiment, the resonance circuit RC is constituted by installing the capacitor C3 in series or parallel with each antenna coil L3. Alternatively, however, a configuration in which the capacitor C3 is not provided may be adopted. That is, the resonance circuit RC may not necessarily be formed. In this case, not the vibration signal Vb illustrated in FIG. 4B, but the signal Va illustrated in FIG. 4A is input to the detection part 140, so that the detection part 140 cannot utilize a change in the component of the resonance frequency fr for the metallic foreign object detection. Thus, in this case, the detection part 140 detects the metallic foreign object existing between the feeding coil L1 and the receiving coil L2 by utilizing a change in the component of the power transmission frequency fp.

Referring to FIG. 3, the detection part 140 functionally includes a detection changeover switch 141, a filter circuit 142, a rectification circuit 143, an integration circuit 144, a determination circuit 145, a wavenumber detection circuit 146, and a control circuit 147A. The wavenumber detection circuit 146 includes a waveform shaping circuit 146a and a counter circuit 146b. The detection changeover switch 141 and the filter circuit 142 constitute a sensor part S together with each resonance circuit RC.

The detection changeover switch 141 is a one-circuit multicontact type switch having a common terminal connected to the filter circuit 142 and a plurality of selection terminals connected to each resonance circuit RC and is configured to connect one of the selection terminals to the common terminal according to control performed by the control circuit 147A. As the detection changeover switch 141, a semiconductor switch or a multiplexer is preferably used.

The control circuit 147A functions as an antenna coil selection part that sequentially selects the antenna coils L3 one by one at an equal time interval. After selecting the last antenna coil L3, the control circuit 147A repeats the selection operation from the first antenna coil L3. The detection changeover switch 141 plays a role of connecting the selection terminal corresponding to the antenna coil L3 selected by the control circuit 147A to the common terminal. With this configuration, the antenna coils L3 are sequentially connected one by one to the filter circuit 142.

The control circuit 147A may be configured to exclude some of the plurality of antenna coils L3 from the selection target coils according to the user's setting or the like. This allows an area to be subjected to the metallic foreign object detection to be narrowed to increase detection time of the metallic foreign object by one antenna coil L3 as compared to a case where all the antenna coils L3 are used.

While the capacitor C3 is provided for each antenna coil L3 in the present embodiment, the total number of the capacitors C3 may be only one. In this case, only the antenna coil L3 that is connected to the filter circuit 142 by switching of the detection changeover switch 141 constitutes the resonance circuit RC together with the one capacitor C3. This configuration can reduce the number of the capacitors C3, which in turn can reduce the number of components constituting the metallic foreign object detector 14A. When the capacitor C3 is provided for each antenna coil L3, a switch for switching the connection between the antenna coil L3 and the capacitor C3 may be provided for each of the resonance circuits RC and configured so as to disconnect, at the time of the metallic foreign object detection, the capacitor C3 from each of the antenna coils L3 other than the one that is connected to the filter circuit 142 by switching of the detection changeover switch 141. This suppresses magnetic coupling between the antenna coil L3 connected to the filter circuit 142 by switching of the detection changeover switch 141 and other antenna coils L3 during the metallic foreign object detection, making it possible to further improve the accuracy of detection of the metallic foreign object.

The control circuit 147A performs the metallic foreign object detection operation by utilizing the selected antenna coil L3. Specifically, the control circuit 147A performs the detection operation by controlling the integration circuit 144, determination circuit 145, and wavenumber detection circuit 146 in the manner as described below. The detection operation is repeated one or more times while one antenna coil L3 is being selected by the control circuit 147A.

The filter circuit 142 is a circuit that generates a vibration signal Vc illustrated in FIG. 4C by removing the component of the power transmission frequency fp from the vibration signal Vb generated in the antenna coil L3 connected thereto through the detection changeover switch 141.

Specifically, the filter circuit 142 may be constituted by a band-pass filter that extracts a frequency of the same band as the resonance frequency fr. On the other hand, when the capacitor C3 is not provided, that is, when the resonance circuit RC is not constituted, it is preferable to constitute the filter circuit 142 by a band-pass filter that extracts a frequency of the same band as the power transmission frequency fp.

The rectification circuit 143 rectifies the vibration signal Vc output from the sensor part S (filter circuit 142) to generate the pulse-like signal Vd illustrated in FIG. 4D. As the rectification circuit 143, a switching element such as a diode, a diode bridge circuit, or a semiconductor switch is preferably used. The signal Vd illustrated in FIG. 4D is an example of a signal obtained when the rectification circuit 143 is constituted by a half-wave rectification circuit; however, the rectification circuit 143 may be constituted by a full-wave rectification circuit, or other rectification circuit.

The integration circuit 144 is a circuit that obtains an integral value IV of the waveform of the signal Vd generated by the rectification circuit 143. Since the signal Vd is a pulse-like signal as described above, the integral value IV of the integration circuit 144 increases stepwise while the signal Vd is generated, as illustrated in FIG. 4E. The start and end of the integration by the integration circuit 144 are controlled by the control circuit 147A.

The wavenumber detection circuit 146 is a circuit that detects the wavenumber of the vibration signal Vd generated by the rectification circuit 143. Specifically, the waveform shaping circuit 146a generates a binary signal CK illustrated in FIG. 4F from the signal Vd, and the counter circuit 146b counts the wavenumber of the binary signal CK to thereby detect the wavenumber of the signal Vd generated by the rectification circuit 143. Hereinafter, the operation of the above circuits will be described in detail.

The waveform shaping circuit 146a performs threshold determination on the signal Vd generated by the rectification circuit 143 to generate the binary signal CK. As a threshold value used in the threshold determination, a previously set reference voltage value is preferably used. The concrete value of the reference voltage value is set to, e.g., the amplitude center voltage of the signal Vd when the metallic foreign object is absent. The binary signal CK is a signal that becomes high when the result of the threshold determination is equal to or larger than the threshold and becomes low when the result of the threshold determination is less than the threshold.

Accordingly, the period of the binary signal CK coincides with the inverse of the resonance frequency of the resonance circuit RC. In the present embodiment, the binary signal CK is generated by the threshold determination on the signal Vd generated by the rectification circuit 143; however, the waveform shaping circuit 146a may generate the binary signal by performing threshold determination on the vibration signal Vc output from the sensor part S (filter circuit 142). In this case, as a threshold value used in the threshold determination, 0V is preferably used. Further, when the capacitor C3 is not provided, that is, when the resonance circuit RC is not constituted, the waveform shaping circuit 146a may generate the binary signal by performing threshold determination on the vibration signal Vb generated in the antenna coil L3.

The counter circuit 146b is a circuit that performs counting using the binary signal CK generated by the waveform shaping circuit 146a as a clock and generates a digital value (count value) indicating the result of the counting. The start and end of the counting by the counter circuit 146b are controlled by the control circuit 147A. The count value generated by the counter circuit 146b coincides with the wavenumber of the signal Vd generated by the rectification circuit 143, so that the wavenumber detection circuit 146 outputs the count value as the result of detection of the wavenumber of the signal Vd generated by the rectification circuit 143.

The control circuit 147A is a circuit that selects the antenna coil L3 in the manner as described above and controls the integration circuit 144 and counter circuit 146b. Specifically, every time the control circuit 147A switches the selection among the antenna coils L3, it supplies a predetermined wavenumber detection start signal to make the wavenumber detection circuit 146 start the wavenumber detection (specifically, make the counter circuit 146b start counting) and supplies a predetermined integration start signal to make the integration circuit 144 start the integration. Thereafter, the control circuit 147A monitors the result (specifically, the count value output from the counter circuit 146b) of the wavenumber detection made by the wavenumber detection circuit 146. When the detection result reaches a predetermined value (hereinafter, referred to as "integration target wavenumber"), the control circuit 147A supplies a predetermined integration end signal to make the integration circuit 144 end the integration and supplies a predetermined wavenumber detection end signal to make the wavenumber detection circuit 146 end the wavenumber detection (specifically, make the counter circuit 146b end the counting). The integration circuit 144 supplies the integral value IV at the time point when the integration is thus ended to the determination circuit 145.

The Timing at which the control circuit 147A makes the wavenumber detection circuit 146 start the wavenumber detection and the timing at which the control circuit 147A makes the integration circuit 144 start the integration may be the same or different. As an example of the latter case, a configuration may be exemplified, in which first the wavenumber detection circuit 146 starts the wavenumber detection, and then the integration circuit 144 starts the integration when the detected wavenumber reaches a predetermined value. This method is suitable considering that the integral value IV and a criterion integral value CIV to be described later are obtained by integrating the waveform having the same wavenumber.

The control circuit 147A also performs operation for acquiring a criterion integral value CIV serving as a criterion for the integral value IV. The criterion integral value CIV is an integral value IV when the metallic foreign object is absent between the feeding coil L1 and the receiving coil L2. The control circuit 147A executes the above control in a state where the absence of the metallic foreign object between the feeding coil L1 and the receiving coil L2 is guaranteed to acquire the criterion integral value CIV. At this time, the control circuit 147A uses the same value of the above-mentioned integration target wavenumber as that when the integral value IV is acquired in normal operation. Accordingly, the integral value IV and criterion integral value CIV are obtained by integrating the waveform having the same wavenumber. The control circuit 147A outputs the acquired criterion integral value CIV to the determination circuit 145 and stores the value CIV therein.

The determination circuit 145 is a circuit that detects the presence/absence of the metallic foreign object between the feeding coil L1 and the receiving coil L2 based on the integral value IV supplied from the integration circuit 144 and the stored criterion integral value CIV previously supplied from the control circuit 147A. Specifically, when the absolute value of the difference between the integral value IV and the criterion integral value CIV falls within a predetermined value, the determination circuit 145 determines the absence of the metallic foreign object, and otherwise, it determines the presence thereof.

Figure 6A:
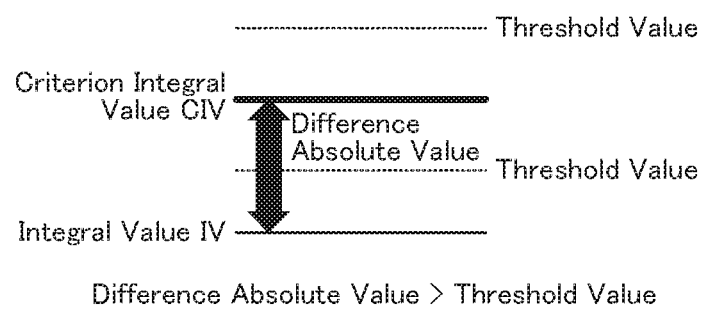
FIGS. 6A and 6B are views for explaining determination processing performed by the determination circuit 145 illustrated in FIG. 3.
Figure 6B:
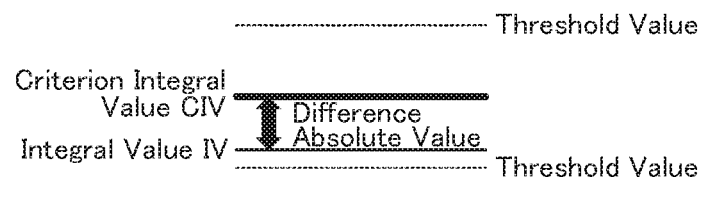

FIGS. 6A and 6B are views for explaining determination processing performed by the determination circuit 145. FIG. 6A illustrates a case where the metallic foreign object is present, and FIG. 6B illustrates a case where the metallic foreign object is absent. With reference to FIGS. 6A and 6B, the determination processing performed by the determination circuit 145 will be described below in greater detail. First, the determination circuit 145 calculates the absolute value of a difference (difference absolute value) between the integral value IV and the criterion integral value CIV. Then, when the difference absolute value exceeds a predetermined threshold value as illustrated in FIG. 6A, the determination circuit 145 determines that the metallic foreign object is present between the feeding coil L1 and the receiving coil L2 (metallic foreign object approaching the feeding coil L1 is present). On the other hand, when the difference absolute value is equal to or less than a predetermined threshold value as illustrated in FIG. 6B, the determination circuit 145 determines that the metallic foreign object is absent between the feeding coil L1 and the receiving coil L2 (metallic foreign object approaching the feeding coil L1 is absent).

Referring back to FIG. 3, the determination result output from the determination circuit 145 is supplied to the control circuit 147A. When the determination result indicates the presence of the metallic foreign object, the control circuit 147A instructs the switch drive part 120 illustrated in FIG. 2 to stop electric power conversion performed in the power converter 12. Upon receiving the instruction, the switch drive part 120 adjusts the control signals SG1 to SG4 illustrated in FIG. 2 so as not to allow AC power to be output from the power converter 12. As a result, the power feeding operation by the wireless power transmitting device 10 is stopped, making it possible to prevent an eddy current from occurring in the metallic foreign object due to an alternating magnetic field generated between the feeding coil L1 and the receiving coil L2, which in turn prevents the metallic foreign object from generating heat.

As described above, according to the metallic foreign object detector 14A of the present embodiment, the integral value IV and the criterion integral value CIV are obtained by integrating the waveform having the same wavenumber, so that, out of changes in the amplitude and frequency of the vibration signal generated in the feeding coil L1 due to approach of the metallic foreign object, a change in the amplitude appears more remarkably in the integral value. Accordingly, the integral value IV is changed substantially monotonously with respect to the change in the amplitude of the vibration signal Vc output from the sensor part S, thus improving the accuracy of detection of the metallic foreign object.

Figure 7A:
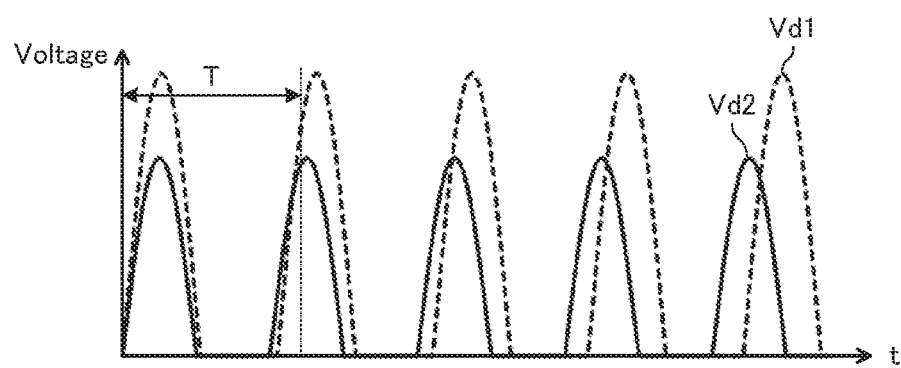
FIG. 7A is a view illustrating a signal Vd1 (dashed curve) which is the signal Vd in the absence of the metallic foreign object and a signal Vd2 (continuous curve) which is the signal Vd in the presence of the metallic foreign object.

FIG. 7A is a view illustrating a signal Vd1 (dashed curve) which is the signal Vd in the absence of the metallic foreign object and a signal Vd2 (continuous curve) which is the signal Vd in the presence of the metallic foreign object. FIG.

7B is a view illustrating an integral value IV1 (dashed curve) which is the integral value IV in the absence of the metallic foreign object and an integral value IV2 (continuous curve) which is the integral value IV in the presence of the metallic foreign object. Hereinafter, with reference to FIGS. 7A and 7B, the above-described effect produced by the metallic foreign object detector 14A according to the present embodiment will be described in detail.

Figure 7B:
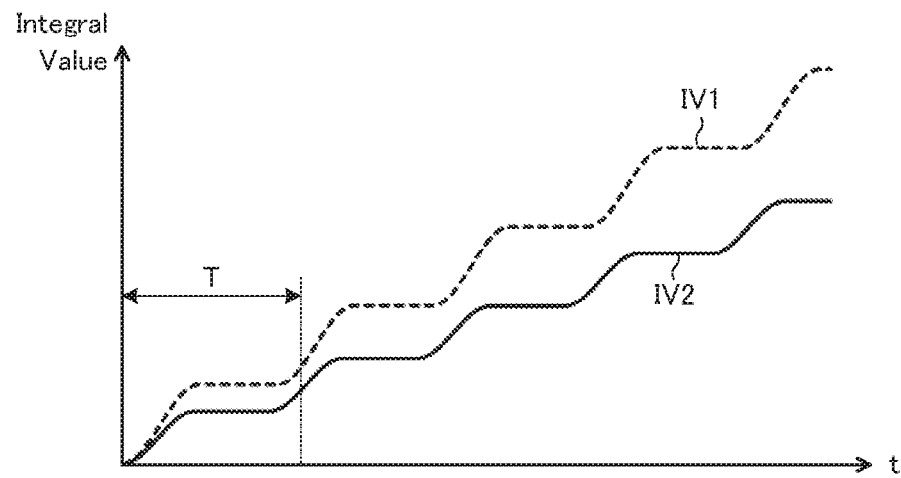
FIG. 7B is a view illustrating an integral value IV1 (dashed curve) which is the integral value IV in the absence of the metallic foreign object and an integral value IV2 (continuous curve) which is the integral value IV in the presence of the metallic foreign object.

As illustrated in FIG. 7A, the amplitude and frequency of the signal Vd differ depending on the presence/absence of the metallic foreign object between the feeding coil L1 and the receiving coil L2. This is because the mutual inductance M12 (see FIG. 2) between the feeding coil L1 and the receiving coil L2 changes depending on the presence/absence of the metallic foreign object. As a result of the change in the amplitude and frequency of the signal Vd, the integral value IV also differs depending on the presence/absence of the metallic foreign object between the feeding coil L1 and the receiving coil L2, as illustrated in FIG. 7B. Thus, for detection of the metallic foreign object, it is sufficient to acquire the integral value IV and then to compare the integral value IV with the criterion integral value CIV that has been acquired in the absence of the metallic foreign object.

However, there may be a case where an appropriate detection result cannot be acquired if the integral value IV and the criterion integral value CIV to be compared are values obtained by integrating the signal Vd for the same time length. For example, when the integral values IV1 and IV2 are acquired within the period T illustrated in FIGS. 7A and 7B, the values of the integral values IV1 and IV2 are substantially the same even though the amplitude and frequency actually significantly differ between the signals Vd1 and Vd2 as illustrated in FIG. 7A. When the integral value IV and criterion integral value CIV to be compared are in such a relationship, the determination circuit 145 may erroneously determine that the metallic foreign object is absent despite the actual presence of the metallic foreign object and the occurrence of a large change in the signal Vd.

The reason that such an erroneous determination occurs is that information of both the amplitude and frequency of the vibration signal Vb is included in the integral value IV, with the result that the wavenumber in a fixed section changes depending on the presence/absence of the metallic foreign object to prevent the integral value IV from monotonously changing with respect to the presence/absence of the metallic foreign object. According to the processing performed by the metallic foreign object detector 14A of the present embodiment, when the metallic foreign object approaches the antenna coil L3, the integral value IV is obtained by integrating the waveform having the same wavenumber as that of the criterion integral value CIV. Thus, out of changes in the amplitude and frequency of the vibration signal Vb generated in the antenna coil L3 due to approach of the metallic foreign object, a change in the amplitude appears more remarkably in the integral value IV. Accordingly, the integral value IV changes substantially monotonously with respect to the change in the amplitude of the vibration signal Vb output from the sensor part S, thus improving the accuracy of detection of the metallic foreign object.

Second Embodiment

The following describes the wireless power transmission system 1 according to a second embodiment of the present invention. The wireless power transmission system 1 according to the present embodiment differs from the wireless power transmission system 1 according to the first embodiment in that it uses a metallic foreign object detector 14B in place of the metallic foreign object detector 14A. Other configurations are the same as those of the wireless power transmission system 1 according to the first embodiment, so the same reference numerals are given to the same components as in the first embodiment, and description will be made focusing only on the difference from the first embodiment.

Figure 8:
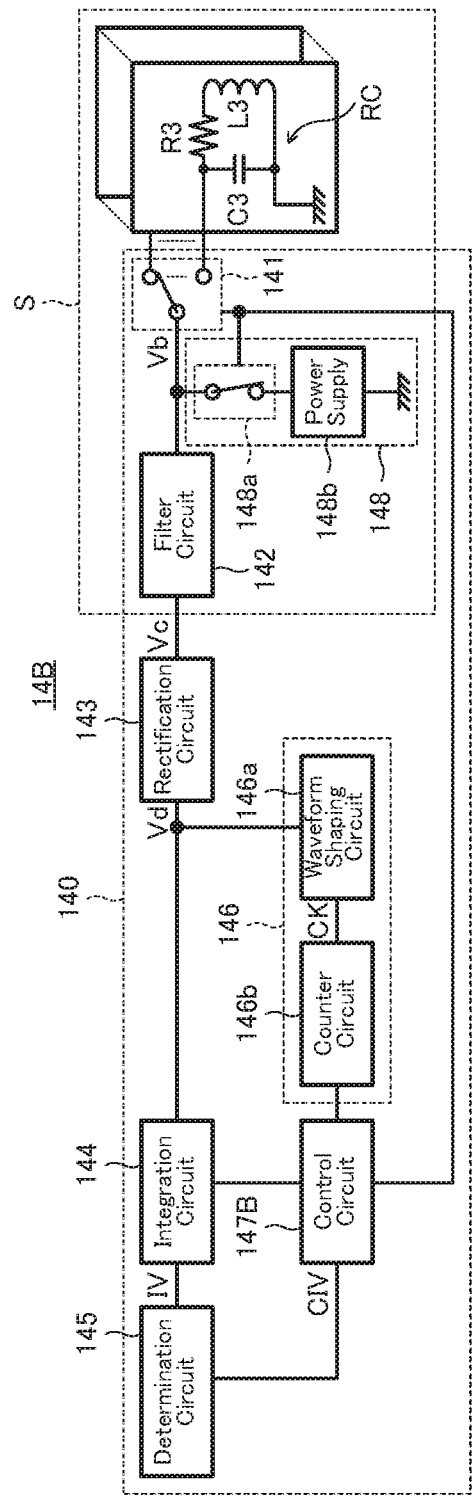
FIG. 8 is a schematic block diagram illustrating the functional block of the metallic foreign object detector 14B according to a second embodiment of the present invention.

FIG. 8 is a schematic block diagram illustrating the functional block of the metallic foreign object detector 14B according to the present embodiment. As illustrated, the metallic foreign object detector 14B of the present embodiment additionally has a drive circuit 148 in the detection part 140 and has a control circuit 147B in place of the control circuit 147A. The drive circuit 148 is a circuit that supplies current to the antenna coils L3, and each of the antenna coils L3 is configured to receive the current supplied from the drive circuit 148 and thus to generate the vibration signal Vb.

The drive circuit 148 will be described more in detail. As illustrated in FIG. 8, the drive circuit 148 includes a switching circuit 148a and a power supply 148b.

The switching circuit 148a is a one-circuit one-contact type switch having a terminal connected to the power supply 148b and a terminal connected to the common terminal of the detection changeover switch 141 and is configured to perform open/close operation according to control performed by the control circuit 147B. As the switching circuit 148a, a bipolar transistor or a MOSFET is preferably used.

The power supply 148b is a power supply for making current flow in the antenna coil L3 and may be a DC power supply or an AC power supply. The following description will be given assuming that the power supply 148b is a DC power supply. One end of the power supply 148b is connected to the switching circuit 148a, and the other end thereof is grounded.

The control circuit 147B according to the present embodiment performs the control of the switching circuit 148a, in addition to the control of the detection changeover switch 141. Specifically, the control circuit 147B selects one antenna coil L3, and the selected antenna coil L3 is connected to the filter circuit 142 by the operation of the detection changeover switch 141. Thereafter, the control circuit 147B brings the switching circuit 148a to a closed state and restores the switching circuit 148a to an opened state after the elapse of a predetermined time. As a result, current is supplied from the power supply 148b to the antenna coil L3. By the thus supplied current, the vibration signal Vb is generated in the antenna coil L3 and supplied to the filter circuit 142.

The operation of the resonance circuit RC when the current is supplied to the antenna coil L3 will be described in detail. By DC current supplied from the power supply 148b while the switching circuit 148a is in a closed state, magnetic energy is accumulated in the antenna coil L3. When the switching circuit 148a is brought to an opened state, attenuation vibration is generated by the magnetic energy. Thus, the vibration signal Vb according to the present embodiment contains a component attenuated while vibrating at the resonance frequency fr of each resonance circuit RC.

In the present embodiment, while the alternating magnetic field generated in the feeding coil L1 is not necessarily required for the operation of the metallic foreign object detector 14B, the vibration signal Vb when the alternating magnetic field is generated (during power feeding) contains the component of the power transmission frequency fp in addition to the above-mentioned component. Also in the present embodiment, the filter circuit 142 plays a role of extracting a frequency of the same band as the resonance frequency fr from the vibration signal Vb.

Figure 9:
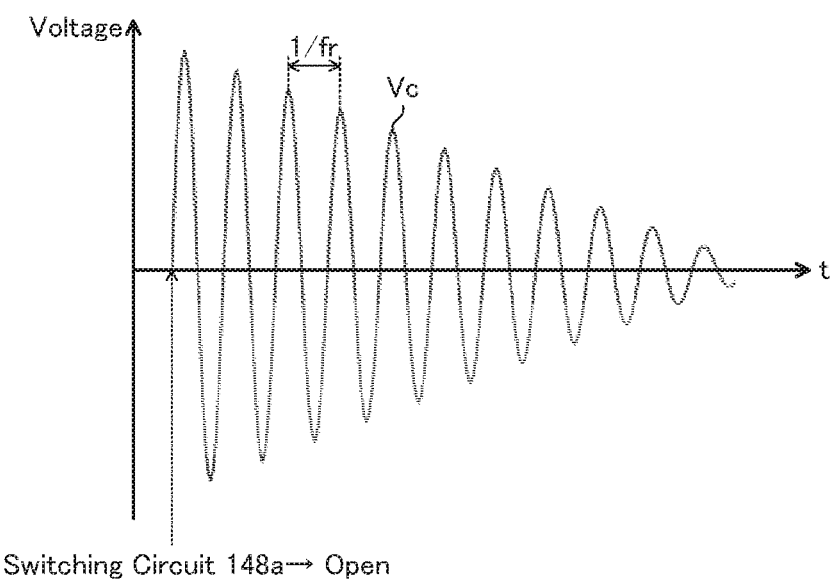
FIG. 9 is a view illustrating the waveform of the vibration signal Vc according to the second embodiment of the present invention.

FIG. 9 is a view illustrating the waveform of the vibration signal Vc (output signal from the filter circuit 142) according to the present embodiment. As illustrated, the vibration signal Vc according to the present embodiment is an attenuated vibration signal that starts attenuation from the moment when the switching circuit 148a is in an opened state. Like the vibration signal Vc according to the first embodiment, the frequency of the vibration signal Vc coincides with the resonance frequency fr of the resonance circuit RC. As already described in the first embodiment, the resonance frequency fr is a frequency extremely higher than the power transmission frequency fp.

Besides the above-described operation, the control circuit 147B performs the same operation as the control circuit 147A according to the first embodiment. Thus, also in the present embodiment, the determination circuit 145 determines the presence/absence of the metallic foreign object approaching the antenna coil L3 based on the integral value IV and criterion integral value CIV which are obtained by integrating the waveform having the same wavenumber. Thus, also in the present embodiment, the accuracy of detection of the metallic foreign object can be improved.

Further, according to the present embodiment, the vibration signal Vb can be generated in the antenna coil L3 without the alternating magnetic field generated in the feeding coil L1, so that it is possible to detect the metallic foreign object entering between the feeding coil L1 and the receiving coil L2 even during a period (while power feeding is stopped) during which the wireless power transmitting device 10 does not perform power transmission.

Further, according to the present embodiment, the Q-value of the antenna coil L3 can be improved as compared to the first embodiment. More specifically, as illustrated in FIGS. 5A and 5B, the plurality of resonance circuits RC are disposed so as to cover an area interlinking magnetic flux that the feeding coil L1 generates. In this case, when the adjacent resonance circuits RC are driven simultaneously, the antenna coils L3 of the adjacent resonance circuits RC are magnetically coupled to each other. As a result, a change occurs in a mutual inductance between the resonance circuits RC, which may significantly degrade the Q-value of each antenna coil L3. According to the present embodiment, only the resonance circuit RC including the antenna coil L3 selected by the detection changeover switch 141 is driven when it is a period (while power feeding is stopped) during which the wireless power transmitting device 10 does not perform power transmission, thereby suppressing the degradation in the Q-value of the antenna coil L3. Thus, it is possible to improve the Q-value of the antenna coil L3 as compared to the first embodiment.

Although the power supply 148b is assumed to be a DC power supply in the present embodiment, it may be an AC power supply, as described above. In this case, the control circuit 147B may control the circuits to acquire the integral value IV with the switching circuit 148a kept in a closed state, and the frequency of the vibration signal Vb in this case coincides with the frequency of AC current generated by the power supply 148b.

Third Embodiment

The following describes the configuration of the wireless power transmission system according to a third embodiment of the present invention. The wireless power transmission system 1 according to the present embodiment differs from the wireless power transmission system 1 according to the first embodiment in that it uses a metallic foreign object detector 14C in place of the metallic foreign object detector 14A. Other configurations are the same as those of the wireless power transmission system 1 according to the first embodiment, so the same reference numerals are given to the same components as in the first embodiment, and description will be made focusing only on the difference from the first embodiment.

Figure 10:
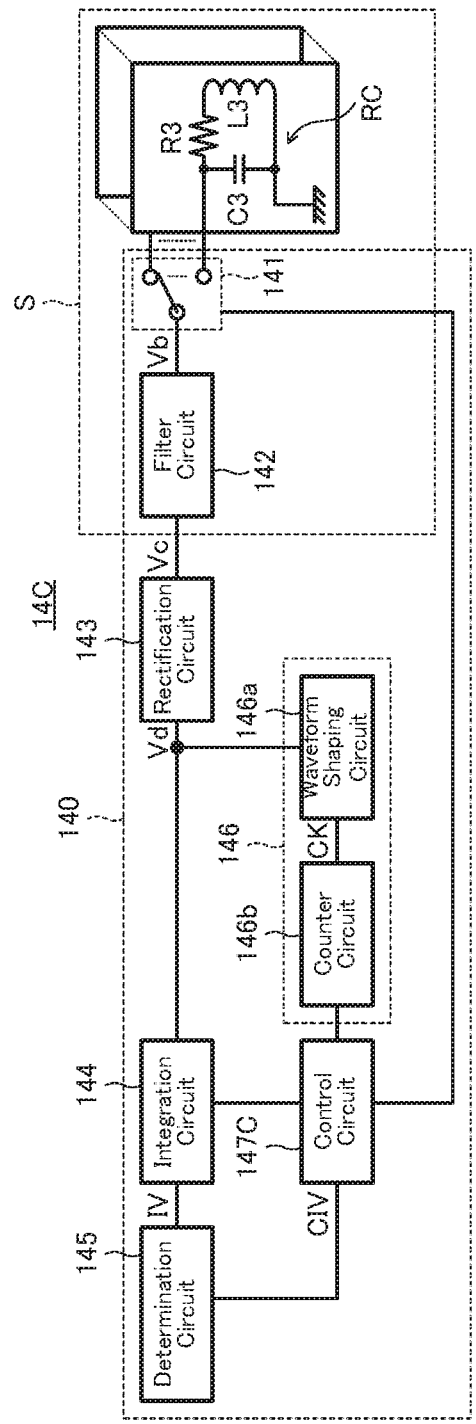
FIG. 10 is a schematic block diagram illustrating the functional block of the metallic foreign object detector 14C according to a third embodiment of the present invention.

FIG. 10 is a schematic block diagram illustrating the functional block of the metallic foreign object detector 14C according to the present embodiment. As illustrated, the metallic foreign object detector 14C of the third embodiment includes a control circuit 147C in place of the control circuit 147A in the detection part 140.

The control circuit 147C has a function of arbitrarily adjusting output timing of the wavenumber detection start signal and that of the integration start signal in addition to the functions of the control circuit 147A. Specifically, the control circuit 147C has an internal timer function and measures the elapsed time from each switching operation of the detection changeover switch 141. Then, when a predetermined time has elapsed from the switching, the control circuit 147C supplies the wavenumber detection start signal to the wavenumber detection circuit 146 and supplies the integration start signal to the integration circuit 144. The predetermined time can be set by a user to any desired value. As described in the first embodiment, the timing at which the control circuit 147C makes the wavenumber detection circuit 146 start the wavenumber detection and the timing at which the control circuit 147C makes the integration circuit 144 start the integration may be the same or different.

Figure 11A:
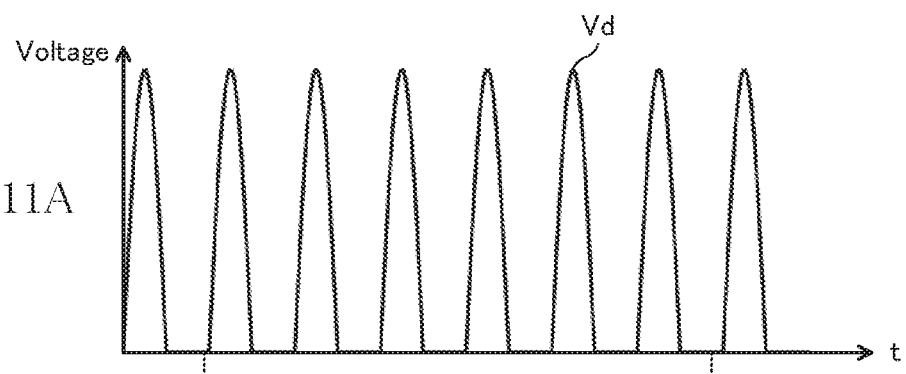
FIGS. 11A and 11B are views illustrating the waveforms of various signals concerning the metallic foreign object detector 14C illustrated in FIG. 10.
Figure 11B:
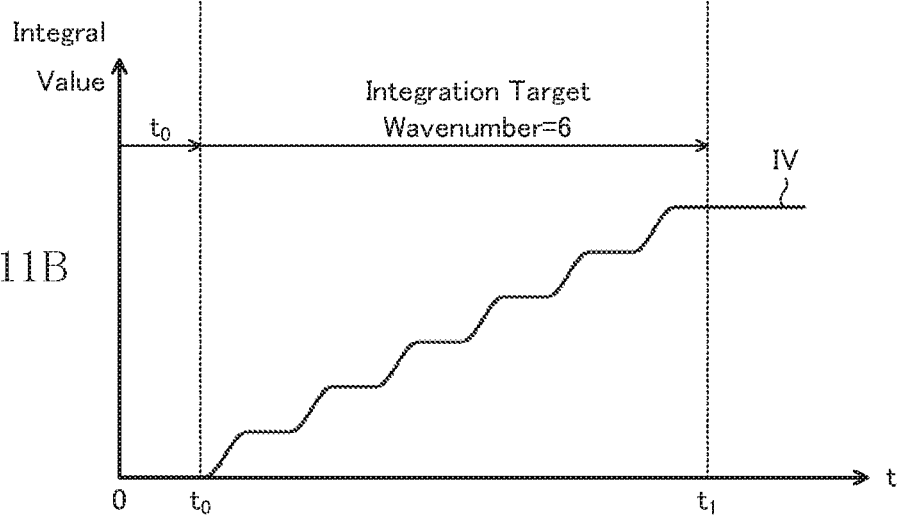

FIGS. 11A and 11B are views illustrating the waveforms of various signals concerning the metallic foreign object detector 14C. In FIGS. 11A and 11B, the left end of the time axis (t) is set to time 0, and it is assumed that switching of the detection changeover switch 141 is made at the time 0. Further, it is assumed that the control circuit 147C outputs the wavenumber detection start signal and the integration start signal simultaneously at the time point when a predetermined time to has elapsed from the switching of the detection changeover switch 141 at the time 0. In this case, the time to is the start point of the waveform integration for acquiring the integral value IV. Thereafter, in the same manner as in the first embodiment, the control circuit 147C makes the integration circuit 144 end the integration when the result of the wavenumber detection by the wavenumber detection circuit 146 reaches the above-mentioned integration target wavenumber ("6" in the example of FIGS. 11A and 11B). As a result, the control circuit 147C can acquire the integral value IV by integrating the waveform of the signal Vd by the integration target wavenumber counted from an arbitrary integration start point. The same applies to the criterion integral value CIV.

According to the metallic foreign object detector 14C of the present embodiment, it is possible to exclude, from the calculation target waveform of each of the integral value IV and the criterion integral value CIV, a part of the waveform corresponding to a period immediately after the switching of the detection changeover switch 141, during which the vibration signal Vb is unstable. Thus, it is possible to further improve the accuracy of detection of the metallic foreign object as compared to a case where the metallic foreign object detector 14C according to the first embodiment is used.

While in the present embodiment, the configuration related to the adjustment of the integration start point is added to the metallic foreign object detector 14A according to the first embodiment, the same configuration may be added to the metallic foreign object detector 14B according to the second embodiment. In this case, when a predetermined time has elapsed from when the drive circuit 148 started supplying current to the antenna coil L3, the control circuit 147C supplies the wavenumber detection start signal to the wavenumber detection circuit 146 and supplies the integration start signal to the integration circuit 144. This makes it possible to exclude, from the calculation target waveform of each of the integral value IV and the criterion integral value CIV, a part of the waveform corresponding to a period immediately after the start of driving of the drive circuit 148, during which a change in the integral value is small while the amplitude of the vibration signal Vb is large.

Fourth Embodiment

The following describes the configuration of the wireless power transmission system according to a fourth embodiment of the present invention. The wireless power transmission system 1 according to the present embodiment differs from the wireless power transmission system 1 according to the first embodiment in that it uses a metallic foreign object detector 14D in place of the metallic foreign object detector 14A. Other configurations are the same as those of the wireless power transmission system 1 according to the first embodiment, so the same reference numerals are given to the same components as in the first embodiment, and description will be made focusing only on the difference from the first embodiment.

Figure 12:
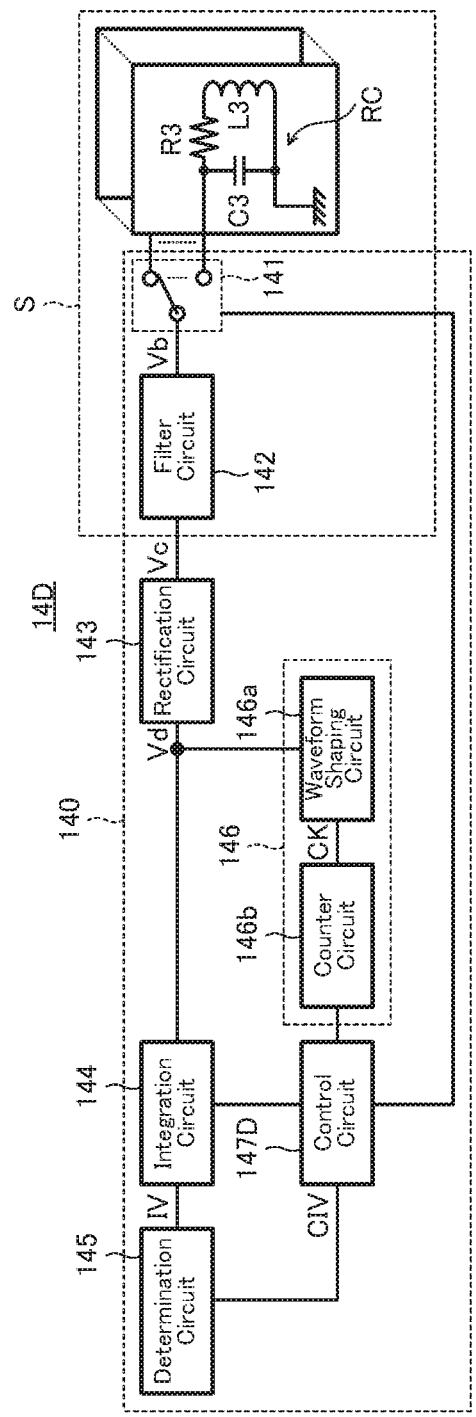
FIG. 12 is a schematic block diagram illustrating the functional block of the metallic foreign object detector 14D according to a fourth embodiment of the present invention.

FIG. 12 is a schematic block diagram illustrating the functional block of the metallic foreign object detector 14D according to the present embodiment. As illustrated, the metallic foreign object detector 14D includes a control circuit 147D in place of the control circuit 147A in the detection part 140.

The control circuit 147D differs from the control circuit 147A in that the above-mentioned integration target wavenumber can be adjusted by a user. Other points are the same as those of the control circuit 147A. The integration target wavenumber is stored beforehand in the control circuit 147D, and a user uses a not-shown input device or the like to rewrite the integration target wavenumber stored in the control circuit 147D, thereby adjusting the integration target wavenumber. The value to be stored in the control circuit 147D as the integration target wavenumber is preferably a natural number. The thus set integration target wavenumber is used also when the control circuit 147D acquires the criterion integral value CIV and, accordingly, also in the present embodiment, the integral value IV and the criterion integral value CIV are obtained by integrating the waveform having the same wavenumber.

According to the metallic foreign object detector 14D of the present embodiment, the wavenumber of the waveform used for acquiring the criterion integral value CIV can be set to a natural number, so that even if the position of the integration start point with respect to the waveform of the signal Vd varies (for example, the integration is started at the peak of the waveform of the signal Vd in some cases, and integration is started when the signal Vd is 0 in other cases), influences exerted on the integral value can be suppressed. Further, by increasing the integration target wavenumber depending on the situation, the difference between the integral value IV and the criterion integral value CIV in the presence of the metallic foreign object can be made even larger, making it possible to further improve the accuracy of detection of the metallic foreign object.

While the preferred embodiment of the present invention has been described, the present invention is not limited to the above embodiment and may be practiced in various forms without departing from the sprit and scope of the present invention.

For example, in the above embodiments, the signal Vd output from the rectification circuit 143 is integrated by the integration circuit 144; alternatively, however, the vibration signal Vc output from the sensor part S may be integrated by the integration circuit 144. In this case, the integration circuit 144 may perform integration after application of bias voltage so that the minimum value of the vibration signal Vc becomes 0 or larger.

REFERENCE SIGNS LIST 1 wireless power transmission system
2 load
10 wireless power transmitting device
11 DC power supply
12 power converter
13 feeding coil part
14A-14D metallic foreign object detector
15 noise detection part
20 wireless power receiving device
21 receiving coil part
22 rectifier
120 switch drive part
140 detection part
141 detection changeover switch
142 filter circuit
143 rectification circuit
144 integration circuit
145 determination circuit
146 wavenumber detection circuit
146a waveform shaping circuit
146b counter circuit
147A-147D control circuit
148 drive circuit
148a switching circuit
148b power supply
C0 smoothing capacitor
C1 feeding side capacitor
C2 receiving side capacitor
C3 capacitor for metallic foreign object detector
CA coil array
CIV criterion integral value
D1-D4 diode
IV integral value
L1 feeding coil
L2 receiving coil
L3 antenna coil
R3 series resistor of the antenna coil L3
RC resonance circuit
S sensor part
SG1-SG4 control signal
SW1-SW4 switching element

What is claimed is:
1. A metallic foreign object detector comprising:
   a sensor part having at least one antenna coil that receives a magnetic field or current to generate a vibration signal;

a rectification circuit that rectifies an output signal from the sensor part to output a signal corresponding to the vibration signal;

an integration circuit that acquires an integral value of a waveform of the signal corresponding to the vibration signal with respect to time over a set wavenumber, wherein the set wavenumber defines a number of detected cycles of the respective vibration signal or the signal corresponding to the vibration signal; and a determination circuit that determines a presence/absence of a metallic foreign object approaching the antenna coil based on comparing the integral value and a criterion integral value;

wherein the criterion integral value is obtained by integrating a criterion waveform of a signal corresponding to a criterion vibration signal generated by the sensor part in an absence of the approaching metallic foreign object with respect to time over the same set wavenumber.

2. The metallic foreign object detector as claimed in claim 1, wherein a start point of integrating the waveform used for acquiring the integral value is freely adjusted, and wherein a start point of integrating the criterion waveform used for acquiring the criterion integral value is freely adjusted.

3. The metallic foreign object detector as claimed in claim 2, further comprising:

a drive circuit that supplies the current to the antenna coil;

a wavenumber detection circuit that detects a current wavenumber of the vibration signal or of the signal corresponding to the vibration signal; and a control circuit that makes the wavenumber detection circuit and the integration circuit start a wavenumber detection and an integration, respectively, and makes the integration circuit end the integration when the current wavenumber detected by the wavenumber detection circuit reaches a predetermined value, wherein the control circuit makes the wavenumber detection circuit and the integration circuit start the wavenumber detection and the integration, respectively, when a predetermined time has elapsed from when the drive circuit started supplying the current to the antenna coil.

4. The metallic foreign object detector as claimed in claim 2, further comprising:

a wavenumber detection circuit that detects a current wavenumber of the vibration signal or of the signal corresponding to the vibration signal; and a control circuit that makes the wavenumber detection circuit and the integration circuit start a wavenumber detection and an integration, respectively, and makes the integration circuit end the integration when the current wavenumber detected by the wavenumber detection circuit reaches a predetermined value, wherein the set wavenumber used for acquiring the integral value and the criterion integral value is freely adjusted due to a fact that the predetermined value is freely adjusted.

5. The metallic foreign object detector as claimed in claim 1, wherein the set wavenumber used for acquiring the integral value and the criterion integral value is freely adjusted.

6. The metallic foreign object detector as claimed in claim 5, further comprising:

a drive circuit that supplies the current to the antenna coil;

a wavenumber detection circuit that detects a current wavenumber of the vibration signal or of the signal corresponding to the vibration signal; and a control circuit that makes the wavenumber detection circuit and the integration circuit start a wavenumber detection and an integration, respectively, and makes the integration circuit end the integration when the current wavenumber detected by the wavenumber detection circuit reaches a predetermined value, wherein the control circuit makes the wavenumber detection circuit and the integration circuit start the wavenumber detection and the integration, respectively, when a predetermined time has elapsed from when the drive circuit started supplying the current to the antenna coil.

7. The metallic foreign object detector as claimed in claim 5, further comprising:

a wavenumber detection circuit that detects a current wavenumber of the vibration signal or of the signal corresponding to the vibration signal; and a control circuit that makes the wavenumber detection circuit and the integration circuit start a wavenumber detection and an integration, respectively, and makes the integration circuit end the integration when the current wavenumber detected by the wavenumber detection circuit reaches a predetermined value, wherein the set wavenumber used for acquiring the integral value and the criterion integral value is freely adjusted due to a fact that the predetermined value is freely adjusted.

8. A wireless power transmitting device that wirelessly transmits power from a feeding coil to a receiving coil, the wireless power transmitting device comprising:

the feeding coil; and the metallic foreign object detector as claimed in claim 1.

9. A wireless power receiving device that wirelessly receives power with a receiving coil from a feeding coil, the wireless power receiving device comprising:

the receiving coil; and the metallic foreign object detector as claimed in claim 1.

10. A wireless power transmission system that wirelessly transmits power from a feeding coil to a receiving coil, the wireless power transmission system comprising:

a wireless power transmitting device having the feeding coil; and a wireless power receiving device having the receiving coil, wherein at least one of the wireless power transmitting device and wireless power receiving device has the metallic foreign object detector as claimed in claim 1.

* * * * *